May 5, 1936.  L. HIND  2,039,997
MEASURING INSTRUMENT
Filed Oct. 12, 1934
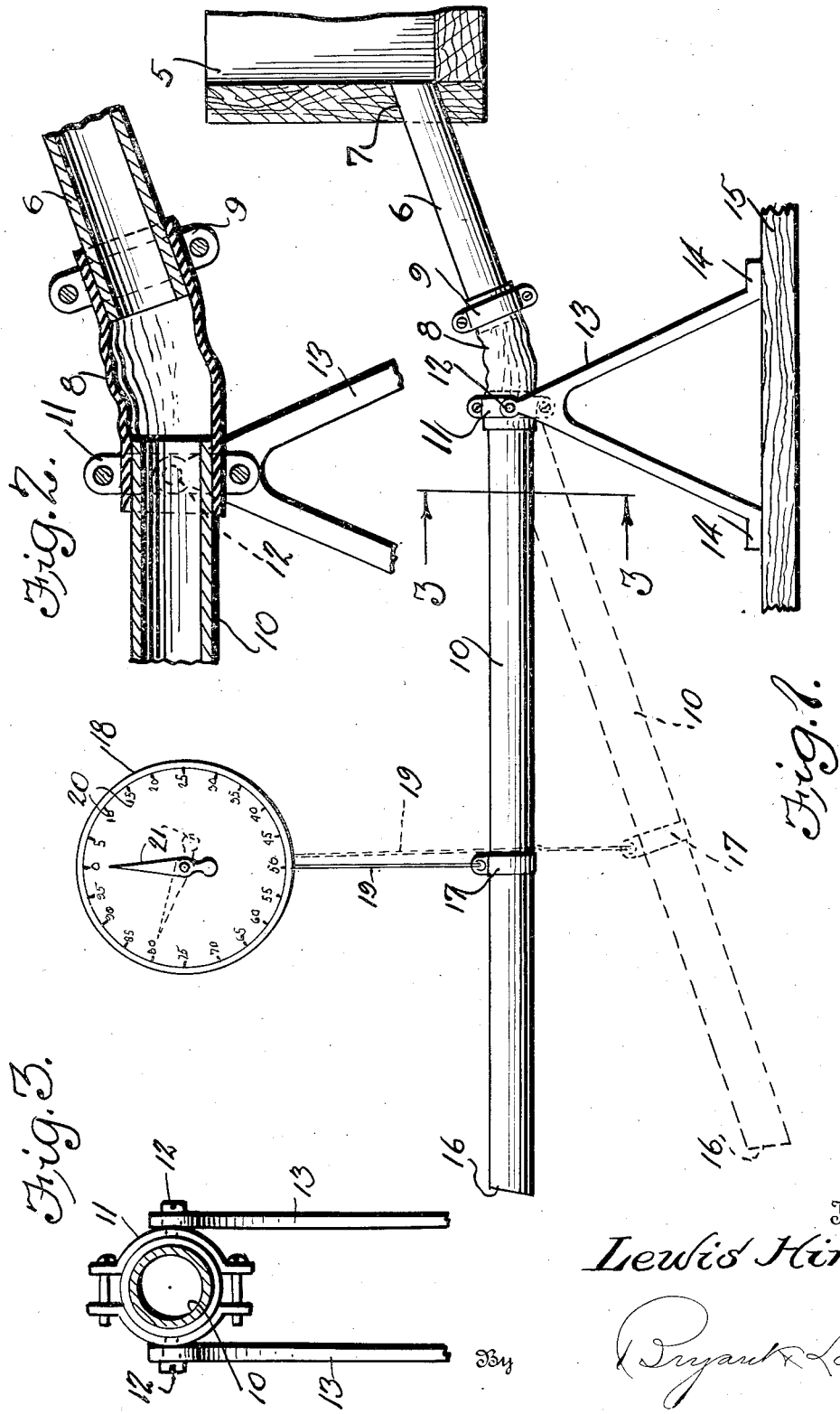
Inventor
Lewis Hind.
By
Bryant & Lowry
Attorneys Patented May 5, 1936

2,039,997

UNITED STATES PATENT OFFICE 2,039,997

MEASURING INSTRUMENT

Lewis Hind, Grass Valley, Calif.

Application October 12, 1934, Serial No. 748,105

2 Claims. (Cl. 265—27)

This invention relates to measuring instruments of the type particularly adapted for measuring the viscosity of liquid and the primary object of this invention is to provide means whereby a continuous stream of liquid may be weighed for determining the solid content.

A further object of this invention is to provide means for weighing a continuous stream of liquid flowing from an elevated receptacle or tank, whereby the weight of said liquid flowing through said tank will at all times be known and variations in the solid content may be readily indicated.

A further object of this invention is to provide a device of the above mentioned character having a pivoted tube through which a stream of liquid is adapted to flow and secured to the tube is provided a suitable connection with a scale which may be either a spring or weight scale.

A further object of this invention is to provide a device of the above mentioned character in which the pivoted tube is connected to the scale.

Other objects and advantages of the invention will become apparent during the course of the following description, taken with the drawing, wherein, Figure 1 is a side plan view of the device embodying this invention;

Figure 2 is a longitudinal cross-sectional view through the connection between the pivoted tube and the source of supply and also illustrating the pivotal connection between the tube and its support; and Figure 3 is a transverse cross-sectional view taken on line 3—3 of Figure 1, looking in the direction of the arrows and further showing the details of the pivotal connection between the tube and its support.

In the drawing, wherein for the purpose of illustrating the invention and wherein like reference characters will be employed to designate like parts throughout the same, the reference character 5 will generally be employed to designate a receptacle or tank through which may be pumped or a launder or trough through which may flow pulp or liquid containing solid particles such as samples of ore and slime.

The entire flow of liquid pulp is not intended to be passed through the pipe 6 and the device herein described and attached thereto but merely a portion thereof so that a sample may have its solid content determined. Secured to the tank 5 as at 7 is an inclined pipe 6 and said pipe 6 is provided on its other end with a flexible coupling 8 held in place by a clamping band 9. The other end of the flexible coupling 8 may be connected to a pivotally supported tube 10 by means of a similar clamping ring 11 having trunnions 12 adapted to be journalled in the upper end of a pair of supports 13, the lower ends of which are provided with feet 14 secured to a suitable base or platform 15.

The tube 10 may have its other end 16 presented to a trough or other receptacle for collecting the liquid passing therethrough after the same has been weighed.

Connected to the tube 10 approximately at a point two-thirds the length thereof from the pivot point 12 is a band 17 adapted to be connected to a scale 18 by a flexible connection 19. Said scale 18 may be either of the spring or weight type and may be provided with the usual graduations 20 with which a pointer 21 is adapted to register upon the swinging movement of the tube 10 with an increase or decrease of particles contained in the liquid flowing therethrough.

In milling ore, it is necessary to collect a sample of the pulp or slime at spaced intervals of time in order to determine the solid content or viscosity thereof and this is usually done by an attendant who collects a sample in a receptacle at predetermined intervals who weighs the sample on a scale or other measuring device. Records are kept to indicate from time to time the solid content of the slime or sample and this work requires considerable time and has been found to be inaccurate in many occurrences.

The invention as set forth overcomes the disadvantages just described by presenting an indicator whereby it will be possible at all times to secure an exact reading upon the viscosity or solid content of the liquid. If desired, a recorder may be secured to the scale 18 whereby a twenty-four hour record of the slime viscosity or gravity may be kept as by means of a disc chart operated by suitable clock arrangement and having a pen presented thereto for inscribing a curve corresponding to the movements of the hands or indicator 21.

It is to be understood that the form of the invention herewith shown and described is to be taken as the preferred embodiment of the same and that various changes in the shape, size and arrangement of parts may be resorted to without departing from the spirit and scope of the invention as claimed.

I claim:—

1. A viscosity or gravity meter comprising a support, a tube having one of its ends pivoted to said support, a liquid supply means communicating with the pivoted end of said tube, a flexible connection between the liquid supply means and the tube, and means for normally retaining the pivoted tube in a horizontal position including a scale and a flexible connection between the scale and tube adapted to be actuated by movements of the tube for actuation of the scale.

2. A viscosity or gravity meter comprising a support, a tube having one of its ends pivoted to said support, a liquid supply means communicating with the pivoted end of said tube, a flexible connection between the liquid supply means and the tube and means for normally retaining the pivoted tube in the horizontal position including a scale located above the tube and intermediate the ends thereof, a flexible element depending from the scale and attached to the tube for the support of the free end thereof and for actuation by pivotal movements of the tube for actuation of the scale.

LEWIS HIND.